United States Patent
Marchini et al.

(10) Patent No.: US 6,634,391 B2
(45) Date of Patent: Oct. 21, 2003

(54) INTEGRATED FLUID CONDUCTION SYSTEM

(75) Inventors: Péricles Marchini, Pirituba (BR); Celso Geraldo Longhi, Santo André (BR)

(73) Assignee: Sabo Sistemas Automotivos Ltda. (BR)

( * ) Notice: Subject to any disclaimer, the term of this patent is extended or adjusted under 35 U.S.C. 154(b) by 0 days.

(21) Appl. No.: 10/077,758

(22) Filed: Feb. 20, 2002

(65) Prior Publication Data

US 2003/0116217 A1 Jun. 26, 2003

(30) Foreign Application Priority Data

Dec. 20, 2001 (BR) .............................................. 0106444

(51) Int. Cl.[7] .................................................. F16L 9/00
(52) U.S. Cl. ...................... 138/177; 138/106; 138/103; 285/236; 285/252; 285/279
(58) Field of Search ................. 138/177, 109, 138/103, 106, 178; 285/236, 252, 253, 279

(56) References Cited

U.S. PATENT DOCUMENTS

| | | | |
|---|---|---|---|
| 144,997 A | 11/1873 | Mayall | 285/252 |
| 1,264,659 A | 4/1918 | Klimek | 24/279 |
| 2,117,955 A | 5/1938 | Haas | 285/148.2 |
| 2,208,706 A | 7/1940 | Spencer | 285/253 |
| 2,363,206 A | 11/1944 | Sprouse | 24/286 |
| 2,408,347 A | 9/1946 | Sprouse | 24/274 R |
| 2,550,186 A | 4/1951 | Clamp | 285/8 |
| 3,043,612 A | 7/1962 | Pavlik et al. | 285/226 |
| 3,104,898 A | 9/1963 | MacDonald et al. | 285/236 |
| 3,233,922 A | 2/1966 | Evans | 285/236 |
| 3,263,520 A | 8/1966 | Tschanz | 138/109 X |
| 3,334,928 A | 8/1967 | Schmunk | 285/110 |
| 3,359,017 A | 12/1967 | Schaub | 285/236 |
| 3,365,218 A | 1/1968 | Denyes | 285/253 |

(List continued on next page.)

FOREIGN PATENT DOCUMENTS

| DE | 3543717 | 6/1987 |
|---|---|---|
| FR | 44151 | 8/1934 |
| GB | 1057936 | 2/1967 |

*Primary Examiner*—Patrick Brinson
(74) *Attorney, Agent, or Firm*—Dickinson Wright PLLC

(57) ABSTRACT

An integrated fluid conduction system or hose assembly comprising a hose, a clamp, and a coupling device wherein the hose includes an external surface and a projection, with an orifice, extending from the external surface. The clamp includes an opening to receive the projection. The coupling device includes a compression section and a leg for coupling, fixing and positioning the projection orifices so that the compression section engages the clamp external surface so as to retain and stabilize the clamp to the hose. The invention is further directed to a coupling device as generally described above as well as to a method for coupling a clamp to a hose with the coupling device including the steps of positioning the clamp on the hose by disposing the projections into the clamp opening and attaching the coupling device to the hose, including placing the legs of the coupling device into the projection orifices, to couple the clamp to the hose.

23 Claims, 4 Drawing Sheets

U.S. PATENT DOCUMENTS

| | | | |
|---|---|---|---|
| 3,407,448 A | 10/1968 | Tetzlaff et al. | 24/19 |
| 3,424,482 A | 1/1969 | Ligon | 285/230 |
| 3,477,106 A | 11/1969 | Tetzlaff et al. | 24/279 |
| 3,526,416 A | 9/1970 | Kish | 285/12 |
| 3,729,027 A | 4/1973 | Bare | 138/109 |
| 3,813,116 A | 5/1974 | Horsley | 285/236 |
| 3,933,377 A | 1/1976 | Arrowood | 285/61 |
| 4,039,210 A | 8/1977 | Wood et al. | 285/112 |
| 4,128,921 A | 12/1978 | Heinze et al. | 24/279 |
| 4,135,744 A | 1/1979 | Fouts | 285/253 |
| 4,173,989 A * | 11/1979 | Prest | 138/109 |
| 4,520,952 A | 6/1985 | Wahl et al. | 285/236 X |
| 4,538,839 A | 9/1985 | Ledgerwood | 285/236 |
| 4,564,220 A | 1/1986 | Sills et al. | 285/236 |
| 4,592,575 A | 6/1986 | Hughes et al. | 285/252 |
| 4,691,740 A * | 9/1987 | Svetlik et al. | 138/109 |
| 4,763,695 A | 8/1988 | Dooley | 138/109 |
| 4,776,613 A | 10/1988 | Dickey et al. | 285/45 |
| 4,799,287 A | 1/1989 | Belanger et al. | 15/405 |
| 4,854,349 A * | 8/1989 | Foreman | 138/89 |
| 4,922,583 A | 5/1990 | Wentworth | 24/279 |
| 5,002,094 A | 3/1991 | Brovont | 138/109 |
| 5,692,544 A * | 12/1997 | Friedrich et al. | 138/99 |
| 6,155,302 A * | 12/2000 | Fischerkeller et al. | 138/109 |

\* cited by examiner

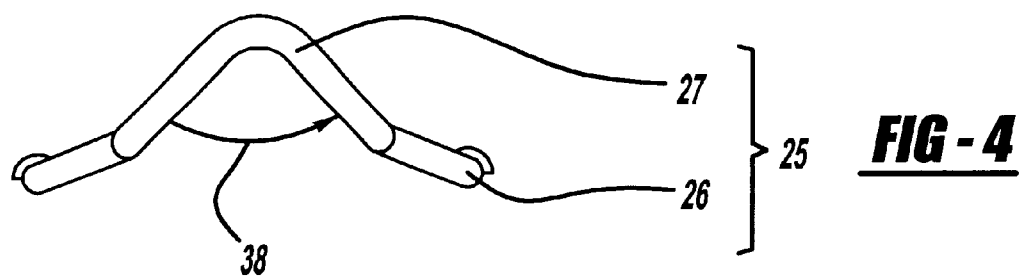
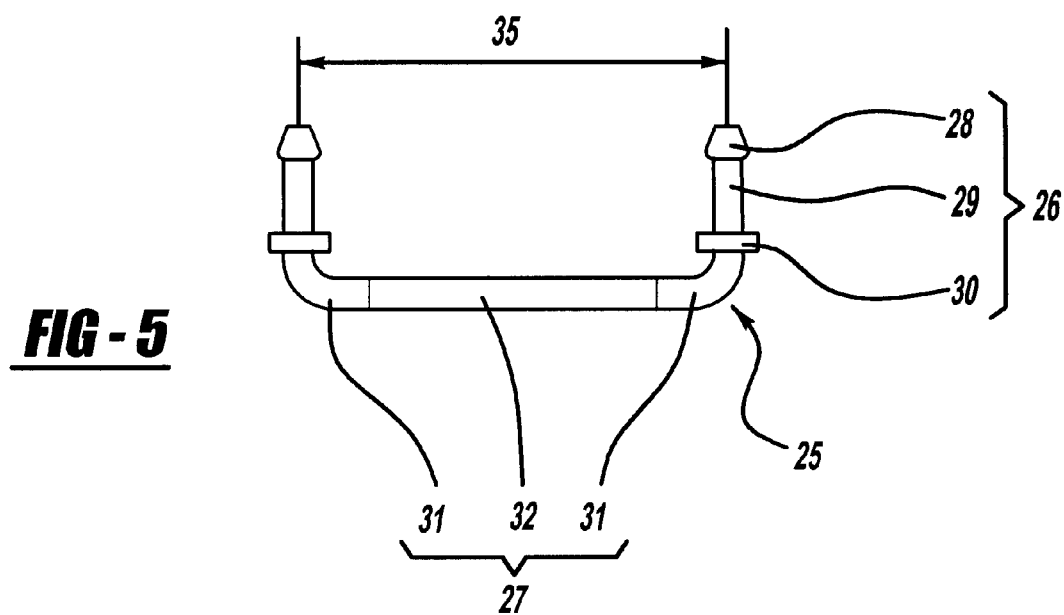
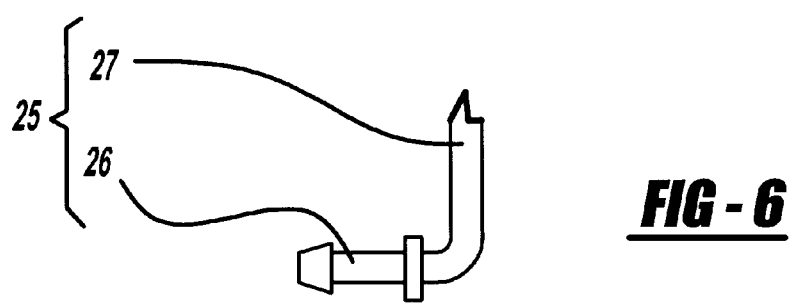

INTEGRATED FLUID CONDUCTION SYSTEM

BACKGROUND OF THE INVENTION

The present invention relates to an integrated fluid conduction system and, more specifically, such a fluid conduction system or assembly belonging to the field of automotive parts and that has received a new construction in order to facilitate the set manufacture and/or assembling strategy.

Integrated fluid conduction systems are already known, particularly for use in the automotive industry. For example, one such system includes an elastomeric hose through which the fluid circulates; a clamp that fixes the hose in its use location; and a device that fixes and positions the open clamp in the hose at the hose's factory standard. The set arrives assembled at the assembly line of the hose's receiving mechanism and ready to be fixed in the use location. In the currently more spread construction form of this type of system, the device for fixing and positioning the clamp in the hose is essentially comprised by an elastomeric part that has a section placed over a clamp section, as well as section(s) stuck to section(s) of the hose adjacent to the clamp. The hose, clamp and fixing device are commonly incorporated one into the other during the vulcanization operation.

The production modes of industries in general, specifically of the motoring industry, have constantly changed with the purpose of being optimized. In light of this, it is not rare that parts of a certain set are manufactured in different plant sites and assembled in one of the sites or in other locations, which are more appropriate, in accordance with a manufacture strategy.

Hence, although commercially available integrated fluid conduction systems, as they are usually constructed, serve for the purpose to which they are designed, they may not meet, in a completely proper manner, the needs of certain production modes currently used due to the fact that the hose and the clamp leave the factory necessarily assembled together.

SUMMARY OF THE INVENTION

Hence, among the purposes of the present invention is to provide an integrated fluid conduction system in which the hose and the clamp may or not leave the hose manufacturer's location assembled together so that the system is more flexible in that it may be manufactured and/or assembled under different production strategies.

To address these and other purposes that will be apparent to one skilled in the art and as generally discussed below, the present invention is directed to an integrated fluid conduction system or hose assembly comprising a hose, a clamp, and a coupling device. The hose includes an external surface and a projection, with an orifice, extending from the external surface. The clamp includes an opening to receive the projection. The coupling device includes a compression section and a leg for coupling, fixing and positioning the projection orifices so that the compression section engages the clamp external surface so as to retain and stabilize the clamp to the hose. The invention is further directed to a coupling device for positioning and coupling a clamp to a hose with a compression section and projections having orifices. The device includes a compression section and a leg for coupling, fixing, and positioning in the projection orifices so that the compression section engages the clamp external surface to retain and stabilize the clamp to the hose. The invention is further directed to a method for coupling a clamp to a hose with a coupling device. The method includes the steps of positioning the clamp on the hose, including disposing the projections into the clamp opening, and attaching the coupling device to the hose, including placing the legs of the coupling device into the projection orifices, to couple the clamp to the hose.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

FIG. 4 shows a frontal view of a coupling device for retaining the hose, which is part of the system;

FIG. 5 shows a top plan view of the device shown in FIG. 4; and

FIG. 6 shows a side view of the device shown in FIGS. 4 and 5.

DETAILED DESCRIPTION OF THE PREFERRED EMBODIMENT

In conformity with how the figures listed above illustrate, the integrated fluid conduction system of the present invention is part of circuits for the conduction of several fluids, especially with regards to automotive vehicles including the following: oil, water, air, brake fluid and others. The system or assembly 6 includes a hose 8, preferably made of elastomeric or similar material, in which the fluid circulates; an originally open clamp(s) 10 for fixing the hose in its use location; as well as by a coupling device(s) 20 for pre-assembling, pre-positioning and pre-fixing the clamp(s) in the hose. By this configuration, the system or assembly 6, including the hose 8 and open clamp(s) 10, that is provided to the final user is capable of being directly assembled in the use location without the need for the final user to assemble, position and fix its parts.

In this solution, the coupling device(s) 20 for pre-assembling, pre-positioning and pre-fixing the clamp(s) to the hose is not the type in which the clamp and the hose necessarily leave the factory assembled together by means of vulcanization, as usual. Instead, the device(s) 20 for pre-assembling, pre-positioning and pre-fixing the clamp(s) to the hose makes it possible that the clamp 10 and the hose 8 may be assembled together at the hose factory or in other locations that are more appropriate to a system production strategy.

Figure 3:
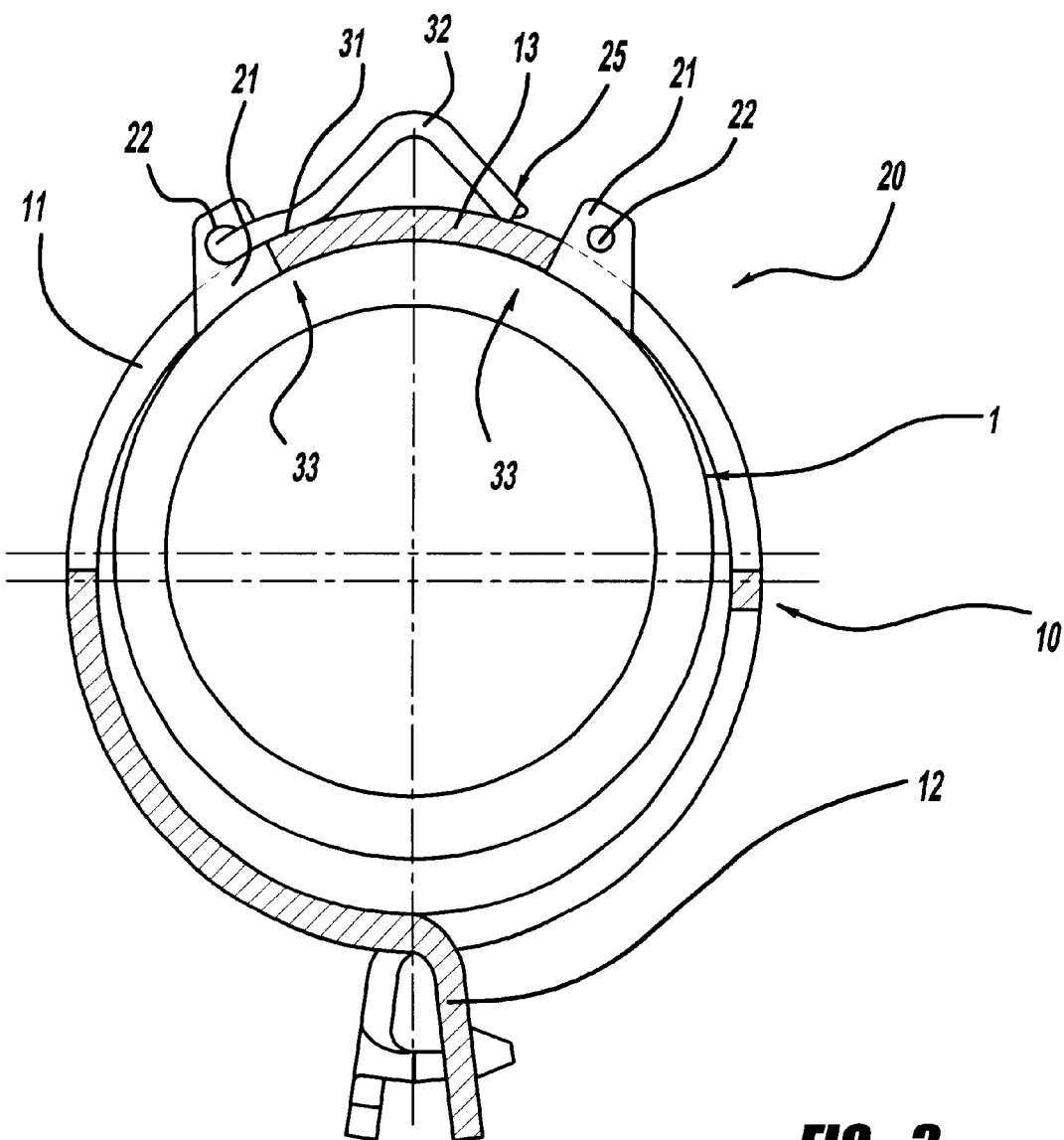
FIG. 3 shows one of the assembled system sections and the assembled system with a partial cut.

The device(s) 20 for pre-assembling, pre-positioning and pre-fixing the clamp(s) to the hose 8 includes elastomeric projection(s) 21 for positioning the clamp 10 on the hose 8. The projections project from the hose external surface, are coupled to or incorporated into said surface such as by means of vulcanization or other equivalent mechanisms generally known in the art, and are proper for being applied and remaining crossed in the respective orifice(s) 11 of the clamp, preferably located opposite to its fastener 12. The elastomeric projection(s) 21 has (have) edges with a passing-through orifice(s) 22 and is (are) positioned within or proximate to a compression region(s) 13 of the external surface of the clamp 10 on the moment of the application of said elastomeric projection(s) 21 in the orifice(s) 11 (FIG. 3).

The device(s) 20 for pre-assembling, pre-positioning and pre-fixing the clamp(s) to the hose further includes a retention part 25 made of metal or another adequate material for retaining the clamp to the hose. The part 25 includes an edge(s) or a leg(s) 26 for coupling, fixing and positioning in the passing-through orifice(s) 22 of the elastomeric projection(s) 21 and a compression section(s) 27 that aligns against the region(s) 13 of the external surface of the clamp 10 for retaining and stabilizing the clamp to the hose 8.

With the basic description provided herein, those skilled in the art will appreciate that the system and assembly, as well as the components thereof, may include modifications relating to materials, dimensions and construction details without leaving the scope of the claimed invention.

In light of this, in a better execution manner known so far, there are two elastomeric projections 21 for positioning the clamp on the hose. The projections 21 are in a substantial tooth form, placed on a same section of the hose 8 and the free edges thereof have their respective passing-through orifice 22 placed parallelly to the hose axle 9 (FIG. 3). The projections 21 are disposed through and coupled in adjacent edges of corresponding orifices 11 made in the clamp 10, aligned in its circumferential direction, and between which is the region 13 of hose compression by the retention part 25. The retention part is preferably comprised of a clip made of metal, plastic or another material that supports the necessary assembly effort and includes a substantially "U" shaped plan configuration with edges or legs 26 for coupling, fixing and positioning in the passing-through orifice(s) 22 of the elastomeric projection(s) 21. The edges or legs 26 further preferably include a conic-trunk edge 28 which may be positioned under pressure to cross the respective orifice 22, an intermediate section 29 which is disposed through the orifices 22 after assembly, and limited between a stop defined by the support of the conic-trunk edge 28 and a flange 30 which together support the retention part 25 in the orifices 22 and positions said part in relation to the clamp. The clip 25 is further provided with the elongated transversal compression section 27 interconnecting the edges or legs 26. The section 27 includes extreme sections 31 adjacent to the legs 26 and which are compressed against the external compression region 13 of the clamp, and an inverted "V"-like section 32 which provides a spring-like effect to the transversal section 27 in order to maintain the compression of the extreme sections 31 against the clamp.

As noted above, the present invention permits the hose and clamp to be assembled together either at the hose manufacturer's location or under different production strategies, such as separate shipment of the hose 8, clamp 10, and/or retention part 25 with assembly occurring later in the process. In either instance, the preferred method of assembling the clamp to the hose includes the steps of disposing the clamp 10 about the hose 8 such that the projections 21 are received within the clamp orifices 11 and the projection orifices 22 being accessible above the external surface of the clamp. The edges or legs 26 of the coupling device, e.g., retention part 25, may then be aligned with the projection orifices 21 and the coupling device axially displaced relative to the hose 8 and clamp 10 such that the conical trunks 28 of the edges 26 are displaced through the corresponding projection orifices 21. In this condition, the intermediate section 29 is disposed in the projection orifices 21 with movement of the coupling device 25 limited by the edge of the conical truck 28 and flange 30.

Figure 1:
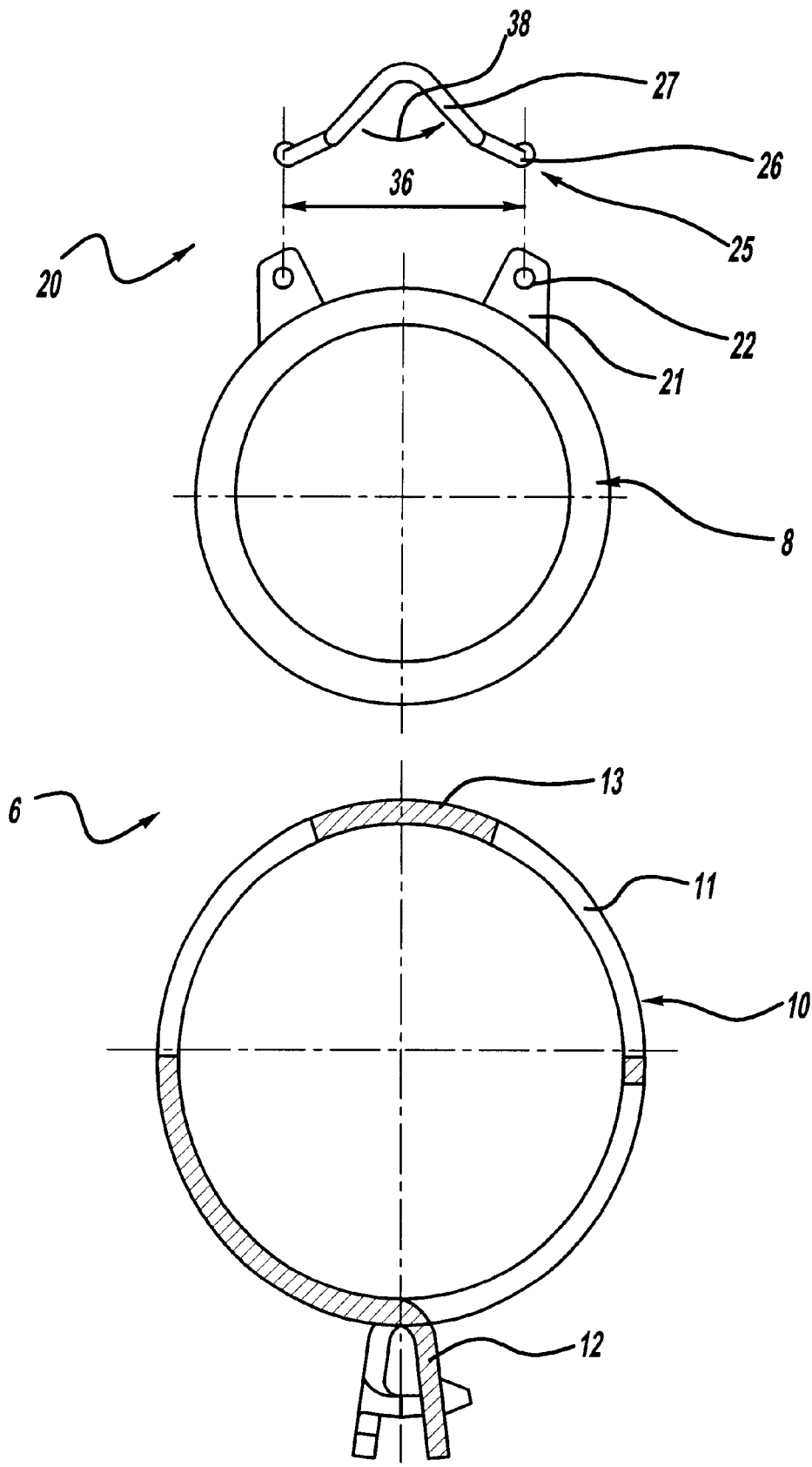
FIG. 1 shows the system with its parts taken in separate.
Figure 2:
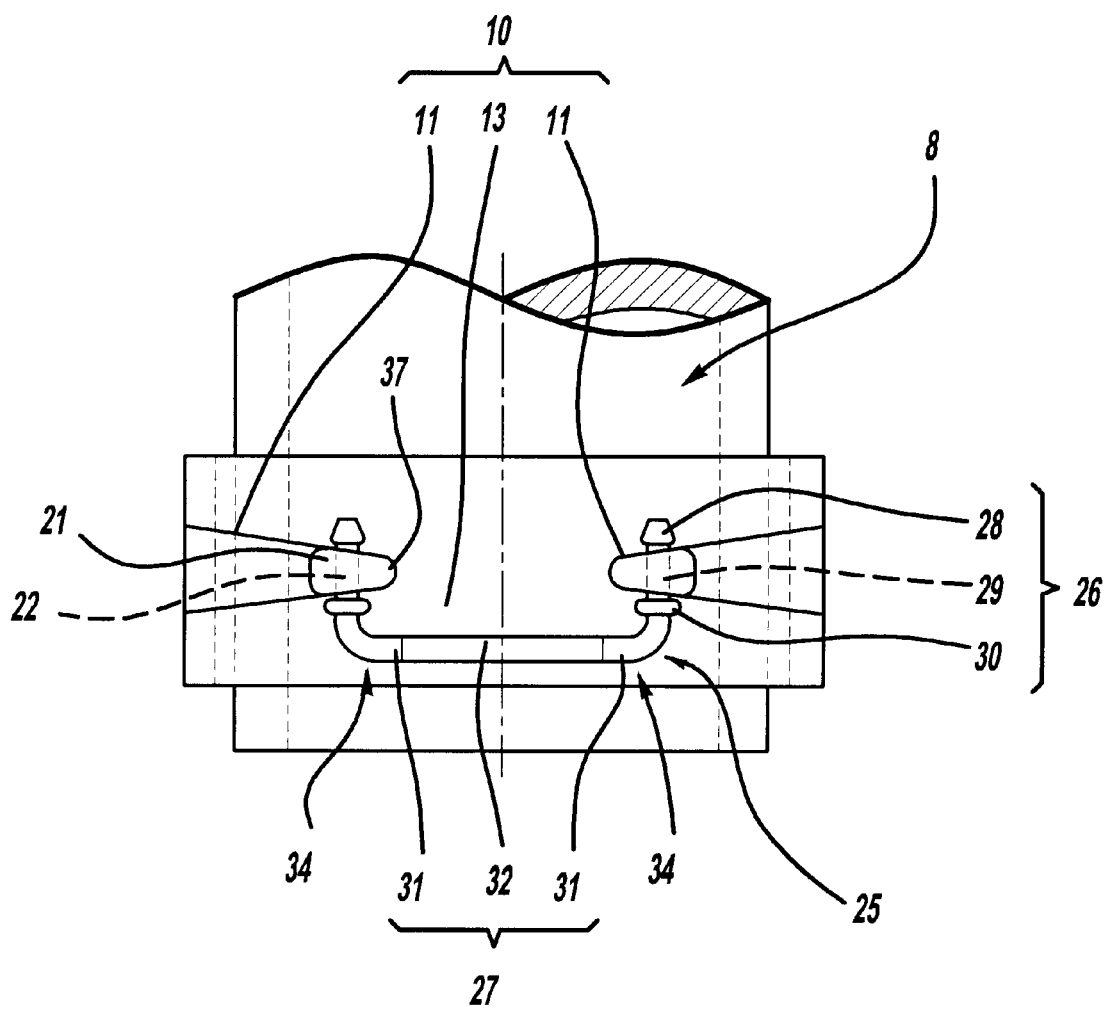
FIG. 2 shows the system with its parts assembled.

In the illustrated embodiment, the coupling device 25 is configured to displace the projections 21 inwardly toward one another during assembly thereby providing first areas 33 of clamp retention (FIG. 3) as well as to compress the clamp 10 downwardly against the compression region 13 of the clamp thereby providing a second area 34 of clamp retention (FIG. 2). As to the first areas 33, the displacement of the projections 21 toward one another is preferably provided by forming the coupling device 25 such that the lateral spacing 35 (FIG. 5) of the edges or legs 26 is less than the lateral spacing 36 (FIG. 1) between the projection orifices 22 when the projections 21 are in their preassembled condition. To further facilitate retention provided in this first area, the facing surfaces 37 of the projections 21 (FIG. 2) and the corresponding faces adjacent the clamp orifices 11 preferably, though not necessarily, have an arcuate or semi-circular configuration. Those skilled in the art will appreciate that the cooperating arcuate configurations effectively restrain the clamp against movement relative to the projections, and therefore relative to the hose, both circumferentially and axially.

As to the second areas 34 of retention, the extreme sections 31 of the connecting device 25 are preferably angled upwardly relative to the edges 26 (FIG. 4) so as to match or approximate the circular contour of the hose 8. The insertion of the edges 26 into the more widely laterally spaced projection orifices 22 not only causes the projections 21 to move inwardly to engage the arcuate ends of the clamp orifices, but also tend to cause an increase in the angle 38 (FIG. 4) of the inverted "V" section 32 thereby creating a spring-like force within the coupling device 25. This spring-like force urges the extreme sections 31 against the clamp and compress the clamp 10 within the region of compression 13 against the hose.

Notwithstanding the above description of the present invention, those skilled in the art will appreciate that a variety of modifications may be made. These modifications may include changes to the retention part as well as other components. By way of example rather than limitation, the retention part 25, instead of being comprised by a molded rod or clip according to the description above, may have a substantially flat form (not illustrated). The edges or legs 26 may be cut in a form that is substantially equal to that of the clip mentioned above for retention in the projections 21 and maintenance of the position in relation to the clamp. Further, the intermediate section 27 preferably has the form of a rectangular plate that is overlapped to the clamp external region 13 so as to provide a better stabilization of the clamp in relation to the hose.

The clamp 10 may be of any adequate type among those usually used, such as the spring-like type according to the attached illustrations, or screw-like and rack-like types, or even other types.

While the hose 8 preferably is elastomeric, it may of any material or structural type among those usually used, such as the type with simple wall or having support comprised of a single hose body with any proper configurations, or comprised of a body with derivation(s), or even other types.

Hence, the system, including the hose 8, clamp 10 and device 20, according to this invention, may be completely assembled at the hose 8, the clamp 10 or the device 20 manufacturing factories. Optionally, all of the parts may be sent disassembled to a certain assembly location. Further, some of the parts, for instance, the hose 8 and the device 20, may be sent to the manufacture location, for example, of the clamp 10, and in said location, the set assembling shall be performed or other manufacture and/or assembly strategies shall be provided, in accordance with the system manufacturer's and/or final user's interests.

The present invention makes the means for obtaining the system significantly more flexible than those of the similar usual systems, without putting the final objective at risk, which is to facilitate the assembly of the system in the receiving mechanism.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A hose assembly comprising:
   a hose having an external surface and a projection extending from said external surface, said projection having an orifice;
   a clamp having an opening to receive said projection; and
   a coupling device having a transverse section and a leg for coupling, fixing and positioning in the projection orifices so that the transverse section engages the clamp external surface to retain and stabilize the clamp to the hose.

2. The hose assembly of claim 1 wherein said projection is an elastomeric projection fixed to said external hose surface by vulcanization.

3. The hose assembly of claim 1 wherein said clamp includes a fastener for changing the diameter of the clamp and wherein the clamp opening is radially opposite said fastener.

4. The hose assembly of claim 1 wherein said coupling device is made of metal or plastic.

5. The hose assembly of claim 1 wherein said hose includes two projections extending from said external surface of said hose, each of said projections having an orifice, and wherein said coupling device includes first and second legs with said transverse section between said legs.

6. The hose assembly of claim 5 wherein said projections are in a substantial tooth form and placed on a same section of the hose.

7. The hose assembly of claim 5 wherein said projection orifices are parallel to the hose axle.

8. The hose assembly of claim 5 wherein said clamp includes first and second spaced opening ends, said projections being coupled to adjacent edge of corresponding clamp openings, aligned in its circumferential direction, and between which is a region of compression of the clamp.

9. The hose assembly of claim 8 wherein said coupling device transverse section is between said edges and each of said legs are disposed in one of said projection orifices.

10. The hose assembly of claim 9 wherein said coupling device transverse section is compressed against the region of compression of the clamp to compress the clamp against the hose.

11. The hose assembly of claim 10 wherein said transverse section has extreme sections and an inverted "V"-like section, said extreme sections being between the legs and compressed against the external region of the clamp, said inverted "V"-like section providing a spring-like effect to the transversal section to maintain the compression against the clamp.

12. The hose assembly of claim 11 wherein said projection orifices are spaced a first distance and said legs are spaced a second distance that is less than the first distance before the coupling device is coupled to said projections.

13. The hose assembly of claim 11 wherein each of said legs have a conic-trunk edge, a flange, and an intermediate section between said conic-trunk edge and flange, said conic-trunk edges positioned on one side of said projection orifices, said intermediate sections disposed in said orifices, and the flanges positioned on another side of the projection orifices.

14. The hose assembly of claim 10 wherein said intermediate sections of the legs are inside the orifices to position said coupling device in relation to the clamp.

15. A coupling device for positioning and coupling a clamp to a hose with an external surface and projections having orifices, said device comprising:
   a transverse section and a leg for coupling, fixing and positioning in the projection orifices so that the transverse section engages the clamp external surface to retain and stabilize the clamp to the hose.

16. The coupling device of claim 15 wherein said coupling device is made of metal or plastic.

17. The coupling device of claim 15 further including a second leg and wherein said transverse section interconnects said legs and each of said legs are disposed in one of said projection orifices.

18. The coupling device of claim 17 wherein said transverse section has extreme sections and an inverted "V"-like section, said extreme sections being between the legs and compressed against the external region of the clamp, said inverted "V"-like section providing a spring-like effect to the transversal section to maintain the compression against the clamp.

19. The coupling device of claim 17 wherein said projection orifices are spaced a first distance and said legs are spaced a second distance that is less than the first distance before the coupling device is coupled to said projections.

20. The coupling device of claim 17 wherein each of said legs have a conic-trunk edge, a flange, and an intermediate section between said conic-trunk edge and flange, said conic-trunk edges positioned on one side of said projection orifices, said intermediate sections disposed in said orifices, and the flanges positioned on another side of the projection orifices.

21. A method for coupling a clamp to a hose with a coupling device, the hose including projections with orifices and the clamp including an opening and wherein the method comprises:
   positioning the clamp on the hose, including disposing the projections into the clamp opening;
   attaching the coupling device to the hose to couple the clamp to the hose including placing a leg of the coupling device into each of the projection orifices.

22. The method of claim 21 wherein the placing of the legs into the projection orifices includes displacing the projections toward one another to retain the clamp between the projections.

23. The method of claim 21 wherein the placing of the legs into the projection orifices further includes compressing the clamp against the external hose surface.

\* \* \* \* \*